United States Patent [19]

Baldi

[11] Patent Number: 5,007,000
[45] Date of Patent: Apr. 9, 1991

[54] CLASSIFICATION OF AUDIO SIGNALS ON A TELEPHONE LINE

[75] Inventor: Charles A. Baldi, Loudon County, Va.

[73] Assignee: International Telesystems Corp., Herndon, Va.

[21] Appl. No.: 373,281

[22] Filed: Jun. 28, 1989

[51] Int. Cl.$^5$ .............................................. G01L 5/00
[52] U.S. Cl. .................................. 364/513.5; 381/46; 379/34
[58] Field of Search ........................... 381/46; 379/34; 364/513.5

[56] References Cited

U.S. PATENT DOCUMENTS

| | | | |
|---|---|---|---|
| 4,027,102 | 5/1977 | Ando | 381/46 |
| 4,405,833 | 9/1983 | Cave et al. | 379/34 |
| 4,477,698 | 10/1984 | Szlam . | |
| 4,540,855 | 9/1985 | Szlam . | |
| 4,542,525 | 9/1985 | Hopf | 381/46 |

*Primary Examiner*—Emanuel S. Kemeny
*Attorney, Agent, or Firm*—Whitham & Marhoefer

[57] ABSTRACT

This telephone solicitation system provides automatic dialing and call-progress detection. Audio signals on the line are analyzed to recognize network operation tones, noise bursts, and speech. A "sample" is the total number of crossings during a 25 millisecond period. A "window" is a sequence of eight samples analyzed for spectral and time patterns.

21 Claims, 10 Drawing Sheets

WINDOW RESULT = TELCO

WINDOW RESULT=ANSWER

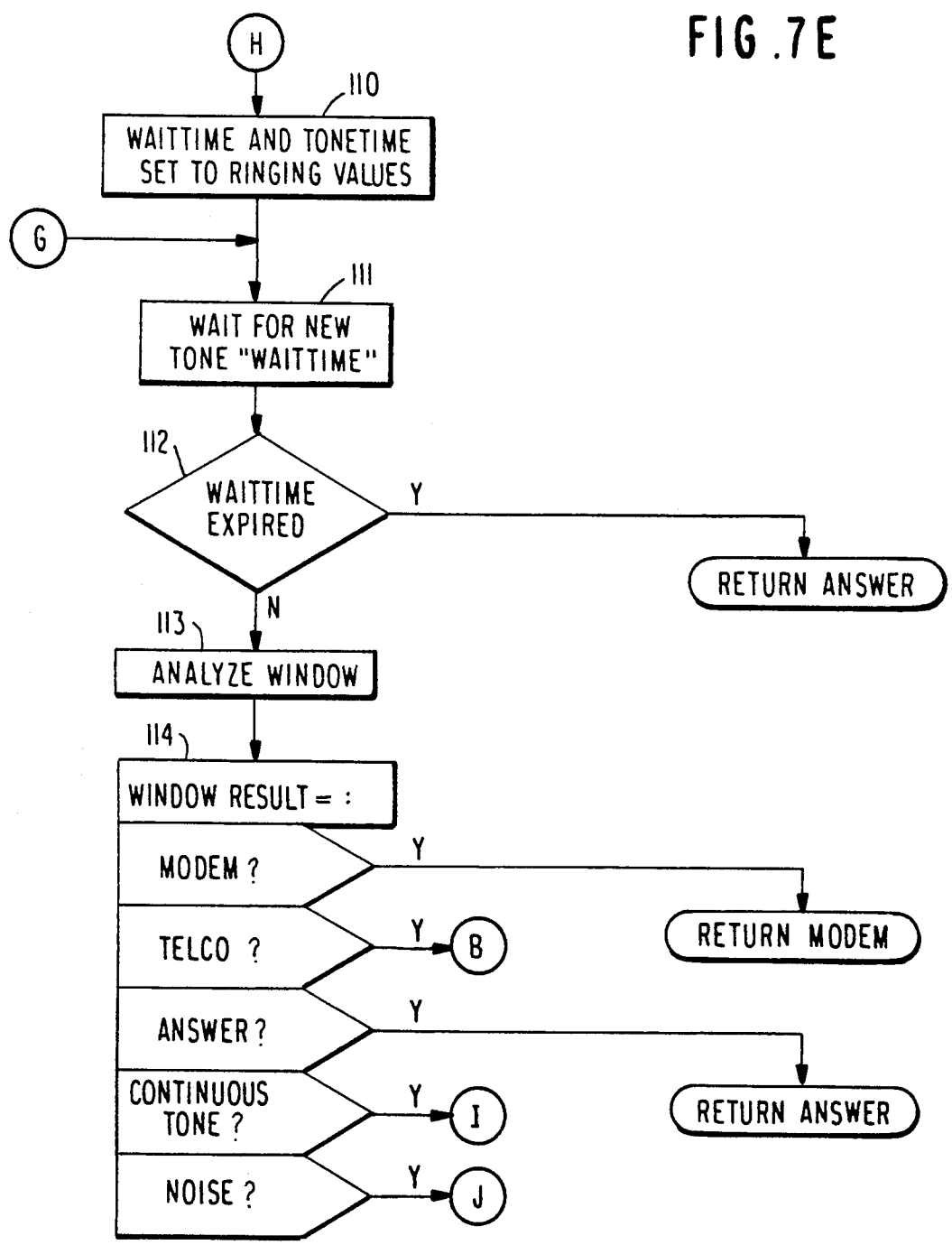

CLASSIFICATION OF AUDIO SIGNALS ON A TELEPHONE LINE

BACKGROUND OF THE INVENTION

1. Field of the Invention

This invention generally relates to the recognition of a human voice as distinct from various call progress and signaling tones on a telephone network and, more particularly, to an improved technique for separating valid audio signals from noise and then classifying those audio signals as call progress or other signaling tones, voice, and even recorded voice.

2. Description of the Prior Art

The invention has specific utility in automatic telephone dialing systems used to deliver prerecorded messages or connect an operator to a called party upon their answer. Such systems are being increasingly used for many commercial applications from the sale of subscriptions to periodicals or the sale of securities by various brokerage houses to the collection of bills. Generally, the system has input to it a list of telephone numbers to dial which are dialed in order, keeping track of those numbers for redial at a later time when a call is not completed. When a call is answered, the system recognizes that the call has been answered, then connects the called party to an available operator who is provided with data on a video display terminal (VDT) screen concerning the called party. If there is no available operator, the system connects the called party to a source of a prerecorded message until an operator becomes available. In this way, the operators are saved the time required to dial and monitor a call, greatly enhancing their efficiency.

These automatic dialing systems must be able to recognize a human voice and various call progress tones. The public telephone network is a challenging environment to attempt this. At first, one would expect that this environment would be ideal. Call progress tones are comprised of various distinct tones generated at predictable intervals whereas the human voice is by, its nature, indistinct and asymmetric. However, in practice, reliable detection of the human voice has proved to be much more difficult than, at first, would be expected.

Actually, there are two separate environments which exist in the public telephone network. The first may be described as a "clean" environment wherein calls have a moderate amount of background noise and the call progress tones follow the Bell Standard Precise Tone Plan; that is, those specific tone frequencies and cadence patterns as specified in Bell publication 61100, "Description of the Analog Voiceband Interface Between the Bell System Local Exchange Lines and Terminal Equipment." The second, in contrast, may be described as a "dirty" environment wherein calls are subject to much noise and/or have call progress tones which do not follow the Bell Standard Precise Tone Plan. Generally, a "clean" environment is associated with new Central Office equipment or large metropolitan areas, and a "dirty" environment is associated with older Central Office equipment or small, independent Central Offices. It is these noise conditions of a "dirty" environment which pose the greatest obstacle to rapid and efficient detection of an answer to a placed call while still filtering out busy signals and other results of call progress.

In the past, several approaches to human voice detection have been employed. For example, U.S. Pat. No. 4,405,833 to Cave et al. describes a call progress detection circuit which makes use of unique properties of call progress tones. More specifically, Cave et al. detect the modulation envelope produced by the difference frequency of two frequencies which compose a call progress tone. The frequency and other timing parameters of the modulation envelope are examined to determine the type of signal. If, for example, a busy signal is detected, the circuit notifies the associated automatic dialing system which will release the line which has been dialed, store the telephone number in memory for later recall, and then dial the next number on a list. If a ringing tone is detected, the circuit will determine if the call is answered.

Another approach is taken by Szlam et al. in U.S. Pat. Nos. 4,477,698 and 4,540,855 which disclose a combination of hardware and digital signal processing for detecting pick-up of a telephone call. The apparatus employs a high gain band pass filter, the output of which goes to a window comparator. The output of the window comparator goes to a digital high pass filter and from there to an integrator for providing a digital output signal indicative of the presence or absence on the telephone line of a signal exceeding a predetermined magnitude within the filter pass band. This digital signal is then processed by a microprocessor based digital filter having a set of predetermined threshold values of durations for states of the digital output signal, by which a determination of a telephone pick-up are made.

Also known is the voice detection circuitry used in the ComPlus equipment manufactured and sold by International Telesystems Corporation of Herndon, Va. This detection circuitry used an algorithm, referred to hereafter as the old recognition method or ORM, which made use of a SAMPLE which is a value representing half the number of zero crossings of an incoming audio signal during a 25 ms period. Eight of these are collected into a WINDOW of data. To classify a WINDOW, all eight SAMPLEs are compared with successive ranges of values. For example, the SAMPLEs with values between seven and twenty-two are tallied and if the count is greater than six, a "TONE" is returned. If this test fails, the number of SAMPLEs with values greater than five are counted. If this count is greater than five, an "ANSWER" is returned, but if five or less, then "NOISE" is returned.

Notice that the data is repeatedly searched for values between certain limits. This has proved to be inefficient. Furthermore, if, while collecting the WINDOW, the value of any one SAMPLE is below three (a predefined quiet threshold), the collection is stopped and a value of "NOISE" is returned. This event will misclassify a voice introduction where, because of the nature of voice, one SAMPLE out of eight is quite likely to fall into the frequency range which is normally filtered out. Instead, the "NOISE" result is ignored, and the "hello" is lost. Now only another "hello" or detecting a break in the cadence of the call can detect the answer. The WINDOW collecting portion does no testing for small or large deviations of SAMPLE values within a frequency range and the frequency "bands" tested are too broad to properly qualify a WINDOW of data as a "TONE". This method does not identify continuous tones in the range of a modem and improperly classifies as "TELCO" some classes of "rings" which have SAMPLEs across several frequency ranges.

The ORM decides to analyze a WINDOW based on information gathered by two functions which monitor for a change of state. These functions are capable only of detecting a change from "tone" to "quiet" or from "quiet" to "tone" and will not detect a frequency shift such as a "ring" becoming a "hello". Finally, the cadence analysis portion of the ORM bases classification decisions on only half the information available for a tone, such as "if the tone lasts as long as a ring, then ringing", but the intervening quiet period may not have also met the "ringing" criteria. This portion will also begin to look for the next change of state without first qualifying the previous change against a possible noise "hit".

SUMMARY OF THE INVENTION

It is therefore an object of this invention to provide a reliable method and apparatus for detecting and answer, while properly classifying other non-answered results of call progress, on any type of telephone network.

According to the invention, there is implemented a method of classification of audio signals on a telephone line which has six portions. They are the cadence analysis, the tone classification method, the state change detection method, the noise filtering method, the data collection method, and the timing method.

The timing method determines the size of audio data collected at one time and provides a means of recording the durations of tones, quiet periods, and the overall length of the call. The data collection method provides a means of converting analog voice frequencies into digital data which can then be processed. It also defines what values the data will have based on the frequencies of the audio being sampled. The noise filtering method provides immunity against typical deviations in the expected tones and quiet periods encountered during a call. The state change detection method provides a means of identifying not only transitions of "tone present" to "quiet" and vice versa, but also triggering on deviations of average frequency which will detect a change from one tone to another. The tone classification method provides a very rapid means of collecting successive data samples into a "WINDOW" and from these samples identify if there is a continuous tone present and if so what type; e.g., human voice, an oscillating tone, or noise. The cadence analysis portion controls all analyses of the call in progress and is the function which decides to return a result and what that result is. It uses as resources the other methods to analyze different portions of the ongoing call.

In the practice of the preferred embodiment of the invention, a telephone line is first selected and a telephone number is dialed. Then, the cadence analysis portion of the recognition algorithm is begun on this line. The cadence analysis routine then controls all sampling of the telephone line and will continue to pursue a call result until one is determined or the call has "timed out"; i.e., the telephone rang a predefined number of times and was not answered. The cadence function uses the state change function to indicate when a tone of some kind has begun on the telephone line. Then, the tone classification method is called to analyze what type of tone this is; e.g., whether noise, an answer (human voice), or a specific tone such as a modem or one of the three telephone operation company (TELCO) tones which precede telephone company intercept messages, or a general tone and its average frequency which could be a ring or a busy signal. The state change or "wait_for_event" function is now used to time the duration of the tone. Once the tone ends, the previous duration of quiet time (if yet measured) is, with the tone duration, compared with possible call states.

At the beginning of a call, these states are large in number but after a state is identified, a much smaller number of states is then possible. For example, if we have seen a slow busy signal, then we need not consider a ring as a subsequent possibility but only need to ensure two more busy tone/quiet instances to qualify this against a possible answer in which the "hello" frequency and duration happened to match that of a busy signal. The cadence function then, if no call result was determined, uses the "wait_for_event" function again to time the length of the quiet period following the tone. When the next tone is detected, it again is analyzed and measured and compared with the then next possible states the call can have. This process is continued until a call result is determined or the cadence portion terminates after a timeout value has been reached.

Throughout the recognition process, the telephone line is continuously monitored at a predetermined sampling rate and the audio signal, whether analog or digital in nature, is converted to zero crossing counts. A "sample" consists of half the number of zero crossings within the defined time period. This "sample" is the basic unit of measurement in the practice of the invention and is the basis of determining the operating range of the sampled audio signals.

Using this sample method, it was discovered that the call progress tones provided by the telephone operating companies result in distinct and identifiable sample patterns. It was further discovered that the spread of the tones closely resembled a spectrum; that is, the tones tended to form distinct and isolated "bands". These discoveries are the foundation of the classification method of the invention. More particularly, a small time "WINDOW", consisting of several consecutive samples, is used to classify tones. During this window period, the samples are first collected and identified according to their respective tone bands and then the spread of the bands is analyzed to classify the tone.

BRIEF DESCRIPTION OF THE DRAWINGS

The foregoing and other objects, aspects and advantages of the invention will be better understood for the following detailed description of a preferred embodiment of the invention with reference to the drawings, in which:

FIGS. 7A to 7F, taken together, are a flow chart of the cadence analysis performed by the invention.

DETAILED DESCRIPTION OF A PREFERRED EMBODIMENT OF THE INVENTION

As used in the following description, "data" means the general nature of the sound on a telephone line and a "tone" describes data which is confined to a particular frequency or range of frequencies. A "sample" is the total number of zero crossings collected during a 25 millisecond (ms) time period. A "window" is a sequence of eight samples collected for analysis. It will be understood by those skilled in the art, however, that these figures are merely illustrative of the preferred embodiment and that different time periods could be used, including the special case where the "sample" and the "window" are the same.

The algorithm implemented by the invention has the following capabilities:

1. Timing sound "data" as well as the progress of the placed call being analyzed.
2. Collecting data within a specified time period. The data may indicate sound presence or it may indicate no sound.
3. Filtering out predetermined levels of noise from the collected data.
4. Detecting a change in the state of the data being collected, including detecting a deviation from within a range of frequencies. This will indicate if a continuous tone or silence has been broken which requires a further detailed analysis.
5. Classifying the data into "tones" or bands of like frequencies.
6. Classifying a series of tones into patterns to compare with the possible expected cadence patterns and isolating an answer from the possible tones and patterns.

The six processes listed above are considered in detail in the following discussion.

The means for timing affects the size of the unit of data as well as the granularity of the call progress timing. The invention relies upon an interrupt to signal the presence of valid data as well as to provide counts which are used to time the overall call progress. In the preferred embodiment, a 25 ms interrupt is used. As will be seen later, this defines the sample values for the different frequencies being analyzed. A different interrupt rate can be used by adjusting the values stored in the band spectrum array (defined later). The band spectrum array, described with reference to FIG. 5, allows rapid classification of frequencies. The 25 ms interrupt rate defines the smallest amount of data which can be processed at one time. A 25 ms collection of data is called a "sample". The 25 ms interrupt is also used in timing the duration of a call, the length of tones and quiet periods, and so forth.

Figure 3:
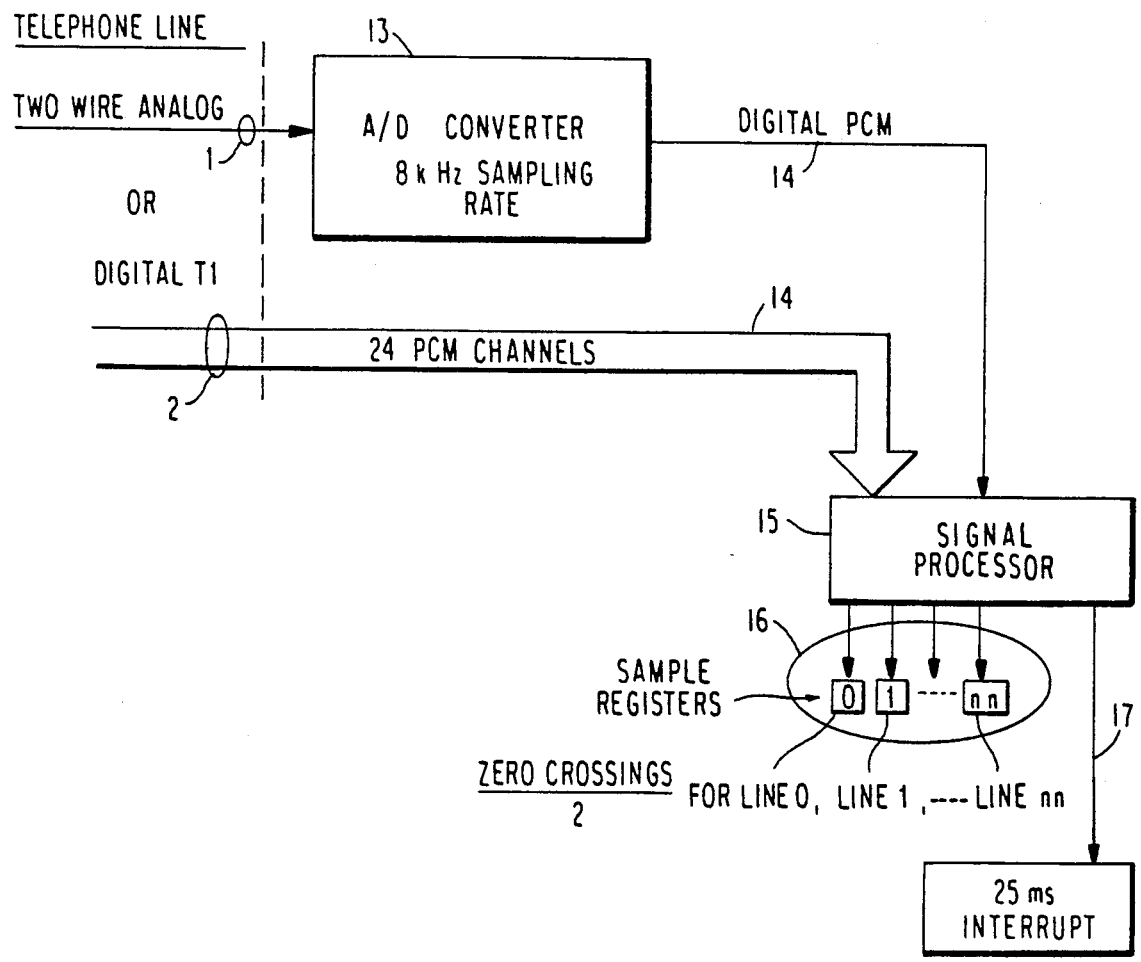
FIG. 3 is a block diagram illustrating the preferred embodiment of data collection.

The system which collects the data used by the preferred embodiment of the invention is shown in FIG. 3. In the case of an analog telephone line 1, the signal is provided to an analog-to-digital (A/D) converter 13 which has a sampling rate of 8 kHz. The A/D converter provides as an output a digital pulse code modulation (PCM) signal 14 at 64 kbits per second. This is an industry standard device for encoding analog signals into digital PCM. The preferred embodiment uses and 8960 CODEC manufactured by MITEL Semiconductor. In the case of digital T1 telephone lines 2, the signal is already twenty-four channels of 64 kbps PCM, and the A/D converter is not required. This PCM signal 14 is provided to a digital signal processor 15 which takes the PCM data for each of the 24 telephone lines and tallies the number of zero crossings generated by the signals in one 25 ms period. At the end of 25 ms, the number zero crossings divided by two for each telephone line are placed in sample registers 16, one register per line. Then the 25 ms interrupt signal 17 is raised to indicate that a set of valid data is ready for processing. The signal processor then begins to tally the zero crossings for the next 25 ms period. The digital signal processor used in the preferred embodiment is the TMS 32010 manufactured by Texas Instruments Inc.

The number of zero crossings divided by two is used because it is a direct representation of the average frequency of the signal during the 25 ms period. Noting that 25 ms is 1/40 of a second, and that each period of a waveform (cycle) generates two zero crossings, the number of cycles per second (Hz) divided by the number of 25 ms divisions in a second gives the number of cycles per 25 ms. This is equal to the number of zero crossings generated by those cycles divided by two. Therefore, to calculate the sample value generated by a particular frequency the following formula is used:

$$\text{sample} = \frac{\text{frequency (Hz)}}{40 \text{ ("25 ms ticks"/s)}}$$

The sample data represents cycles per 25 ms. The preferred embodiment of FIG. 3 is not essential to this invention. Any method or apparatus which provides sample data in cycles per 25 ms (or the selected interrupt rate) and generates an interrupt indicating the presence of valid data can be used.

There is a finite limit to the value a "sample" can attain. It is true that the human voice has a range of roughly 300 Hz to 20 kHz, but the Public Telephone Network inherently limits passed voice frequencies to approximately 3000 Hz, since this is where the bulk of intelligible speech resides. If for purposes of analysis, the upper limit is taken as 4000 Hz, which is well above the defined limit, then the maximum value of a "sample" is 4000 divided by 40, or 100. This means that any "sample" collected as described above will have a value between 0 and 100. This fact is utilized in the establishment of the "band spectrum" array described later.

To operate on many types of telephone lines and under varying degrees of line quality, the invention must be able to tolerate a moderate amount of noise. Noise is defined as a deviation of the current normal state of the data on the telephone line. If the line should be quiet, noise is an unexpected burst of tones of possibly various frequencies. If the line should have a continuous tone like a ringing signal, then noise will be an interruption or deviation of the ring outside its normal frequency range. After much experimentation, it was discovered that most noise has a duration of less than 200 ms and that the vast majority of this noise is actually less than 50 ms long. The invention accomplishes noise immunity by disregarding any change of state which is less than 50 ms in duration. Furthermore, a minimum number of "samples" which qualify for a particular state must be gathered consecutively for the state change to remain valid. This "ignoring" of certain types of data is quite acceptable when it is realized that the shortest call progress tone, a FAST BUSY signal, is 250 ms long and that very few persons indeed can utter a "hello" in less than 200 ms.

The definition of a "state" is the presence of a defined tone or the absence of tone on a telephone line. A change in state is the transition of one tone to another, from a tone to quiet, or from quiet to a tone. The method for detecting changes in the state of the data on a telephone line is accomplished with a WAIT_FOR_EVENT function. The logic of this function is shown by the flow chart in FIG. 4. Generally, the function accepts a low frequency value, a high frequency value and a timeout value given in "number of samples". It then proceeds to monitor every sample as it becomes available. If the samples remain within the range of frequencies given for the entire timeout period, then a "no change" result is sent to the calling function. If the samples deviate from this range for two samples (50 ms) in the same direction, both higher or both lower, then a result is sent to the calling function of "gone high" or "gone low", as the case may be. The special case of "gone quiet" is checked for and returned if the samples are determined to have "gone low". This allows checking for the normal transition of a tone state to a quiet state.

Figure 4:
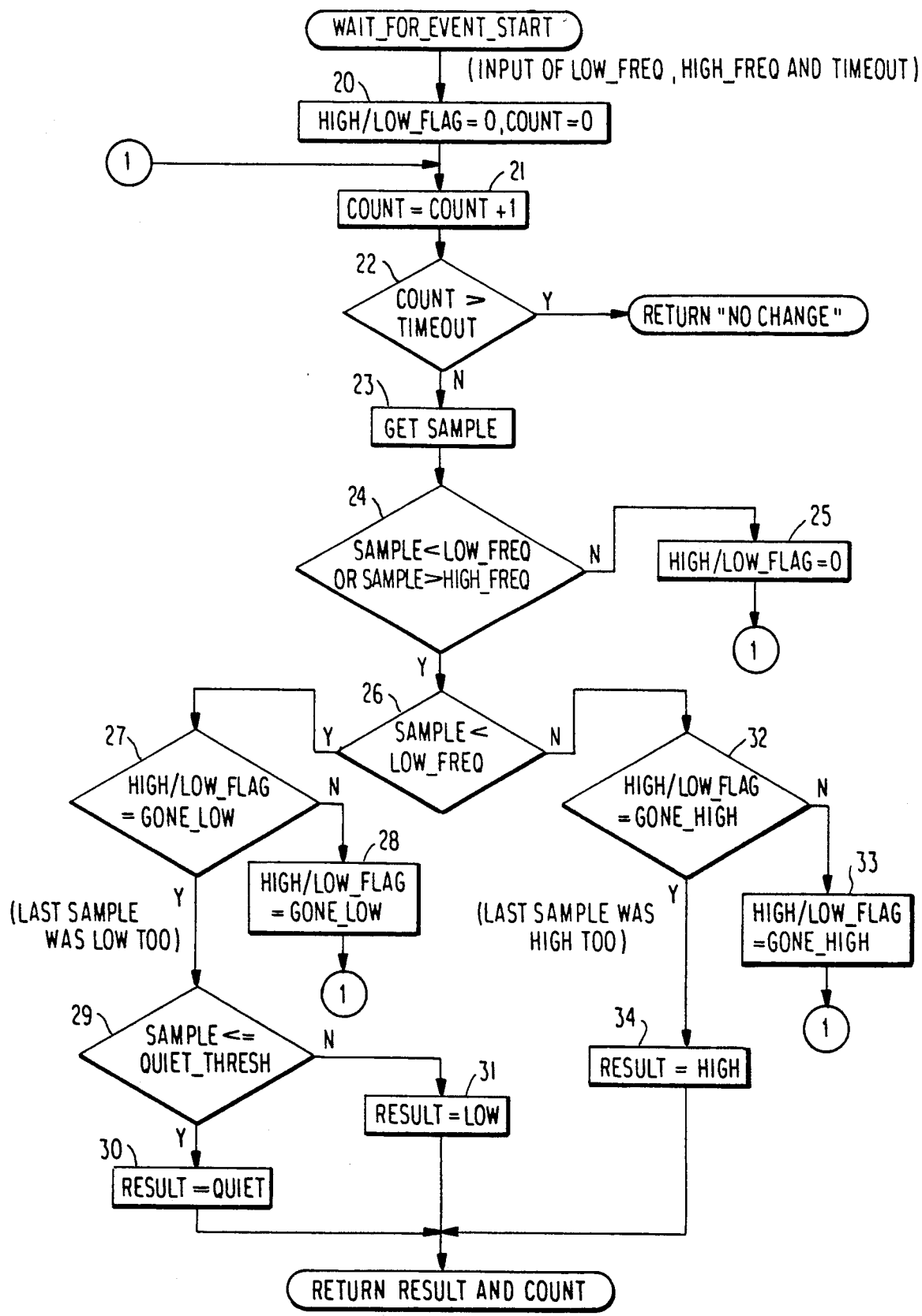
FIG. 4 is a flow chart showing the logic of the WAIT_FOR_EVENT operation implemented by the invention.

Referring to FIG. 4, those skilled in the art can see that this is a loop which has a maximum iteration count of the timeout value. Each pass through the loop retrieves a sample, compares it to the given range of frequencies, and checks a flag which indicates whether the last sample was out of range high or low. If a sample is out of range and the previous sample was out of range in the same direction, then the function returns a result indicating the direction of the change and a count of the number of samples taken before the deviation. If the previous sample was not out of range in the same direction, the high/low flag is set to the current direction of change and the loop reiterated. If the sample is within the range, the high/low flag is reset to reflect no deviation. If the sample has "gone low" twice, the current sample value is compared with a defined quiet threshold value; if below this, then a "gone quiet" result is sent instead of the "gone low" result.

More specifically, the process begins by initializing the HIGH/LOW_FLAG and the COUNT to zero in function block 20. Then, in function block 21, the COUNT is incremented by one, and a test is made in decision block 22 to determine if the COUNT is greater than TIMEOUT. If so, a return of NO CHANGE is made; otherwise, the sample is retrieved in function block 23. The sample is tested in decision block 24 to determine if it is less than LOW_FREQ or greater than HIGH_FREQ. If not, the HIGH/LOW flag is set to zero in function block 25, and the process loops back to block 21.

If the test in decision block 24 is positive, a further test is made in decision block 26 to determine if the sample is less than LOW_FREQ. If so, the HIGH/LOW_FLAG is checked to see if it equals GONE_LOW in decision block 27. If not, the HIGH/LOW_FLAG is set to GONE_LOW in function block 28, and the process loops back to block 21. On the other hand, if the test in decision block 27 is positive indicating that the last sample was low too, then a test is made in decision block 29 to determine if the sample is less than or equal to QUIET_THRESH. If so, the result is QUIET, but otherwise, the result is LOW, as indicated in function blocks 30 and 31, respectively. In either case, the result and the count are returned.

If the test in decision block 26 is negative, a further test is made in decision block 32 to determine if the HIGH/LOW_FLAG is GONE_HIGH. If not, the HIGH/LOW_FLAG is set to GONE_HIGH in function block 33, and the process returns to block 21. On the other hand, if the HIGH/LOW_FLAG is already GONE_HIGH indicating that the last sample was high too, the result is HIGH, as indicated in function block 34, and this result and the count is returned.

This function very quickly and efficiently provides significant information regarding the data on the telephone line. This function is used to wait for a state change in the data which should occur within a particular time period. For example, when given the permitted high and low frequencies of a ringing signal and the maximum duration of a ring, then the end of the ring can be waited for and verified by comparing the returned count to the expected minimum ring duration and the result with "gone quiet" or simply "gone low", which may indicate noise or a possible interruption which may be an answer. Likewise, a period of silence can be monitored with an expected duration, for a premature interruption which again may be an answer or other type of connect.

Figure 2:
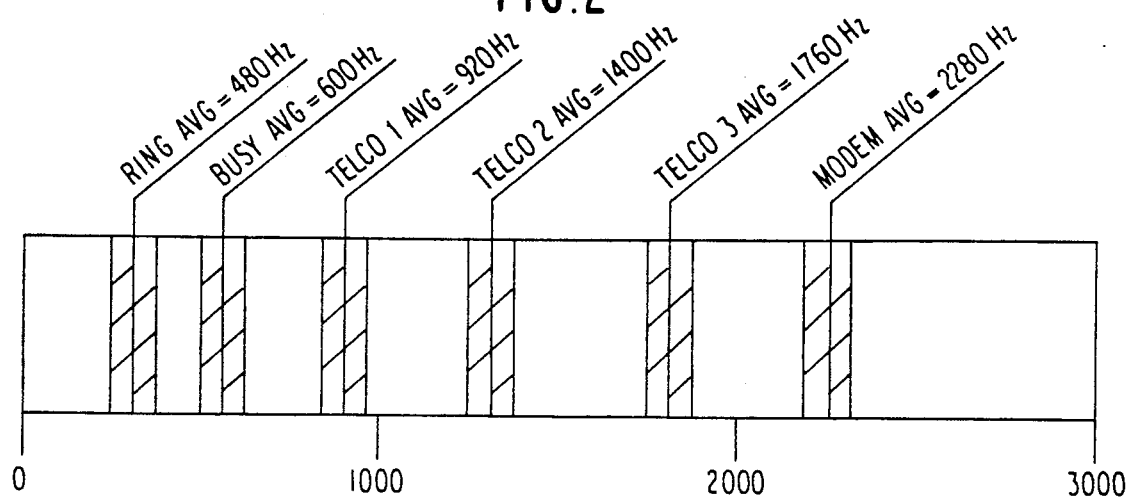
FIG. 2 is a frequency spectrum diagram showing a typical tone pattern encountered in telephone networks in the United States.

Using the aforementioned "sample" method, it was discovered that the call progress tones provided by the telephone operating companies result in distinct and identifiable patterns of samples. It was further discovered that the spread of tones closely resembled a "spectrum"; that is, the tones tended to form distinct and definable "bands". These discoveries are the foundation of the classification method of the invention. FIG. 2 is a diagram of the "spectrum" of tones which is typical to the telephone networks encountered in the U.S. and that used in the preferred embodiment of the invention. These bands are patterned after those described in the Bell Standard Precise Tone Plan.

One problem encountered with the set of bands illustrated in FIG. 2 was that quite frequently the tones actually received as ringback or busy, for example, would be well out of the "defined" range and fall into one of the gaps between tones. This difficulty has been overcome by considering the gaps between tones. More particularly, the gaps between tone definitions are considered as "tones" themselves. Therefore, any continuous tone detected in a gap is given consideration as a possible call progress tone.

One other problem was with a particular class of ringing signals. These rings have a modulating frequency which is vastly different from the base frequency and consequently generate sample values which do not fall entirely within a particular band but seem to oscillate between two bands. This problem was also overcome by measuring the "spread" of the samples, the difference between the highest and lowest bands containing samples, the "direction changes", and the number of times the series of samples changed direction. This oscillating ring produces a pattern of samples which change direction many times but have a small spread of one or two bands.

In the preferred embodiment of this invention, a WINDOW consisting of eight samples is collected for analysis. The WINDOW is analyzed as described below to classify the current tone being received as belonging to one of several predefined results or to a generic "tone" which could be a nonstandard standard ring or busy.

Figure 5:
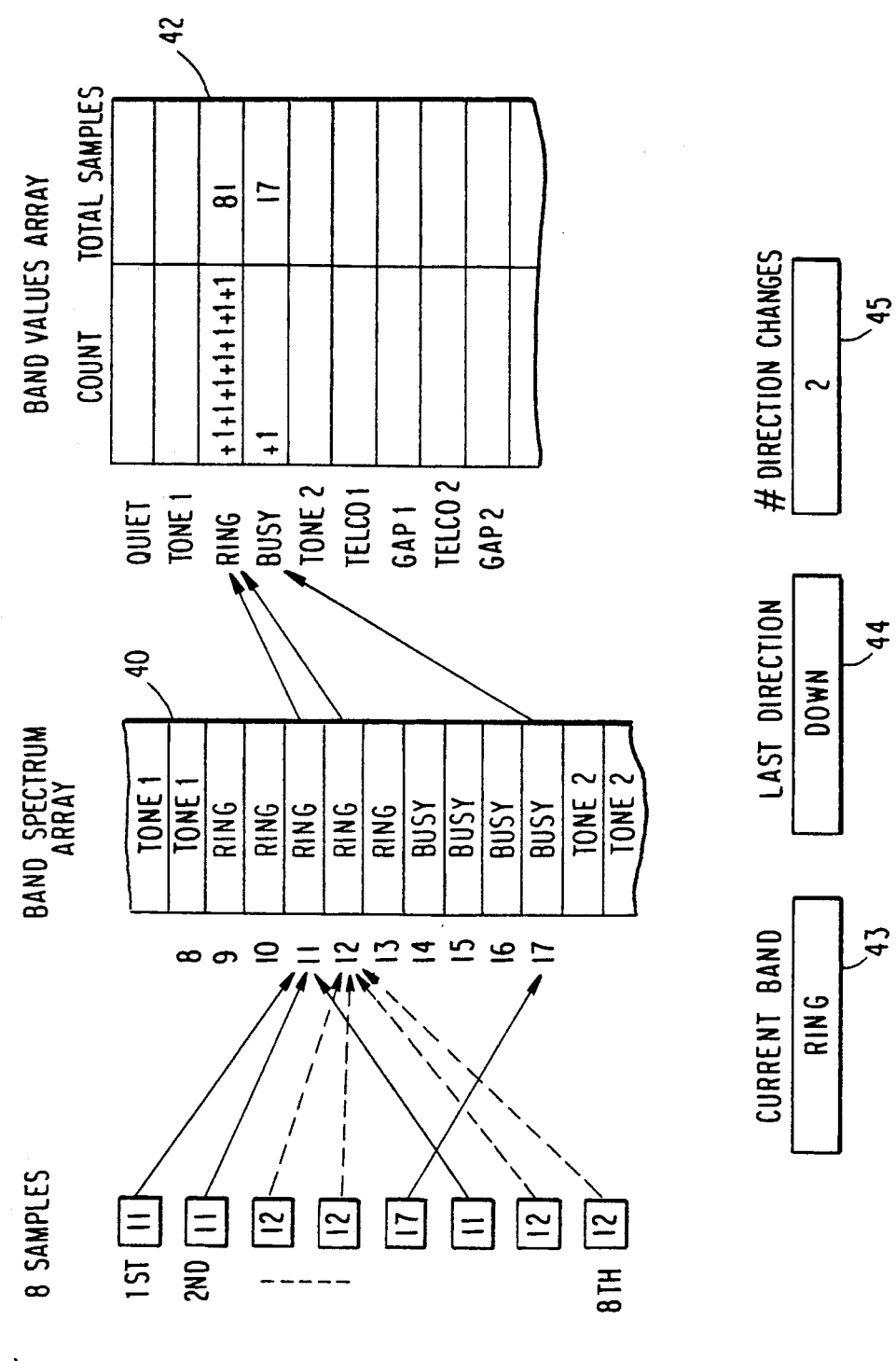
FIG. 5 is a diagram illustrating the computer memory arrays used in the window data collection and analysis process.

The first part of the WINDOW analysis comprises the data collection. The previously mentioned bands and gaps have been numbered as follows:
0 QUIET band
1 TONE1 band
2 RING band 3 BUSY band
4 TONE2 band
5 TELCO1 band
6 TGAP1 band
7 TELCO2 band
8 TGAP2 band
9 TELCO3 band
10 TGAP3 band
11 MODEM band
12 OUT-OF-RANGE band With reference now to FIG. 5, an array 40 called the "Band Spectrum" array is a 100 element array in computer memory containing a numerical value of the band number which corresponds to the element number as it represents a sample value. It was previously shown that the samples generated by the telephone network will never exceed 100. The sample retrieved is used as an index into the band spectrum array 40 which contains the band number assigned to that sample. The band number in turn is used as an offset into a "Band Values" array 42 in memory which is used to keep track of the "count" (number of samples falling in the band) and the "total of the samples" which is used to calculate an average sample value. As each sample of the WINDOW is collected, its band is accessed and information gathered very quickly. Thus, an incoming sample has a value which, by means of the spectrum and band arrays, allows immediate classification of the sample without value testing. Also shown in FIG. 5 are variables which are used to keep track of the current band the samples are falling into, 43, the last direction the samples took to cross a band boundary, 44, and the number of times the samples changed direction when crossing band boundaries, 45.

Figure 6:
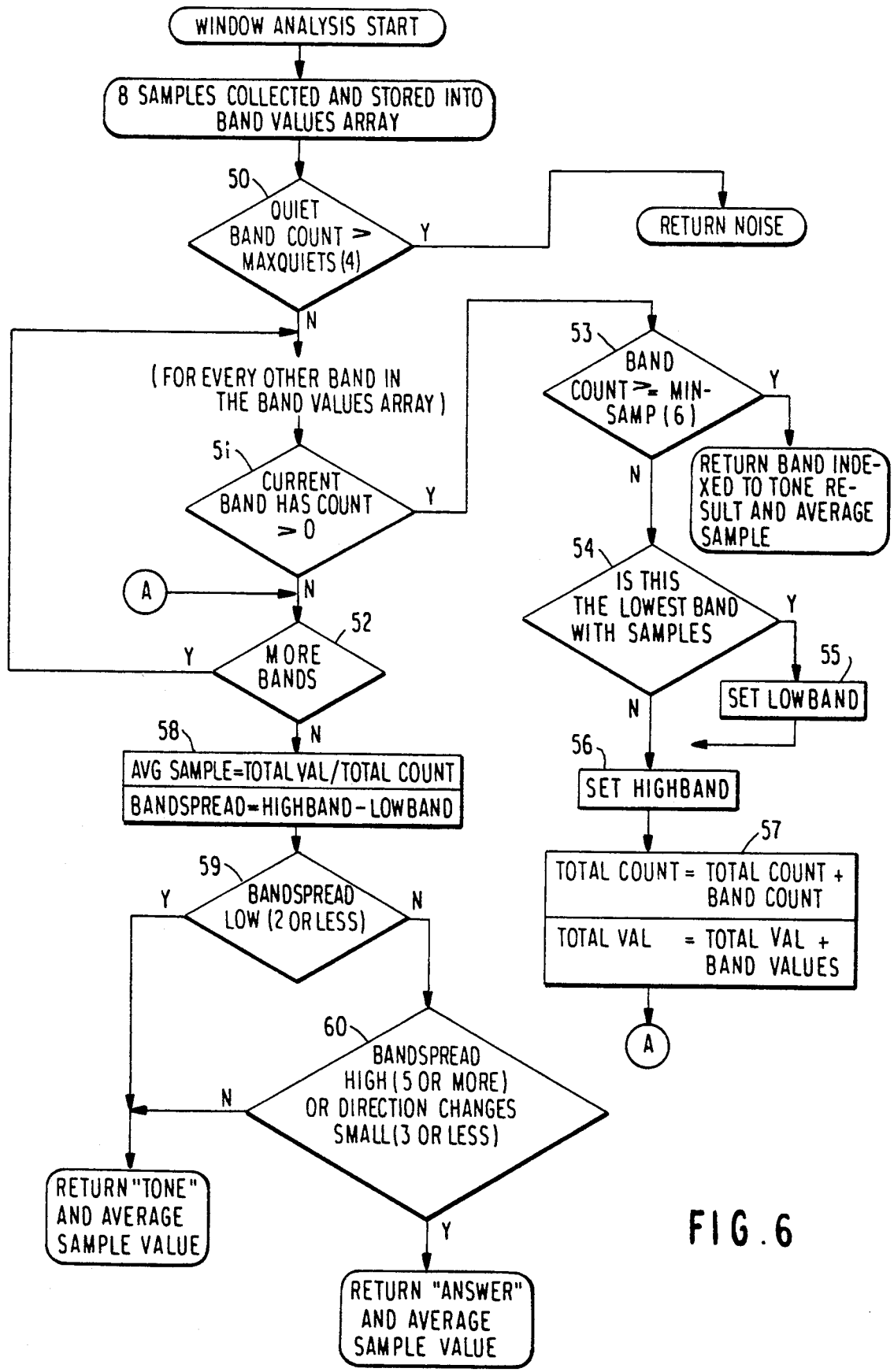
FIG. 6 is a flow chart showing the logic of the window data analysis.

After a WINDOW of samples is collected, an analysis of the data is performed. The logic of this analysis is shown by the flow chart in FIG. 6. The process begins when eight samples are collected and stored into the band values array 40. A test is made in decision block 50 to determine if the quiet band count is greater than four. If so, NOISE is returned; otherwise, and for every other band in the band values array 40, a test is made in decision block 51 to determine if the current band being scanned has a count greater than zero. If not, the next band in succession is scanned as determined by decision block 52 until all bands are scanned. However, when a band is encountered that has a count greater than zero, a test is made in decision block 53 to determine if the band count is greater than or equal to six. If so, the WINDOW is classified as a continuous tone and the band number is used as an offset into a RETURN_MAP array to provide the actual return value to the cadence analysis function.

The RETURN_MAP array maps the "bands" of tone found in the band spectrum array to return values used by the cadence analysis portion of the recognition algorithm. For example, if we found that six samples fell into TC2 (the second TELCO tone), then we would return TELCO to the cadence function. The offset into the array is by BAND number. The RETIRM_MAP array allows many bands of continuous tones to return the same value as well as allow returns of specific values for distinct tones. For example, all three TELCO tone bands return the same value; i.e., TELCO. The RETURN_MAP and band spectrum arrays are described in more detail hereinafter.

If the test in decision block 53 is negative, that is the band count is less than six, a further test is made in decision block 54 to determine if the current band being scanned is the lowest band with samples. If so, a LOW_BAND flag is set in function block 55; otherwise, a HIGH_BAND flag is set in function block 56. Then, the TOTAL_COUNT is computed as the TOTAL_COUNT plus the BAND_COUNT and the TOTAL_VAL is computed as the TOTAL_VAL plus the BAND_VALUES in function block 57.

When all the bands have been scanned, as determined by decision block 52, then the AVG_SAMPLE is computed as the quotient of the TOTAL_VAL divided by the TOTAL_COUNT and the BANDSPREAD is computed as the difference between the HIGH_BAND and the LOW_BAND in function block 58. A test is then made in decision block 59 to determine if the bandspread is low; i.e., two or less. If so, the "TONE" and average sample value are returned. Otherwise, a test is made in decision block 60 to determine if the bandspread is high, i.e., five or more, or the direction of changes is small (three or less). If not, the "TONE" and average sample value are returned as before, but if not, an "ANSWER" and average sample value are returned.

In the preferred embodiment of the invention, there is an overall cadence analysis function which oversees the progress of the entire call and is capable of timing the various instances of tones and silence periods in order to classify them into expected patterns. Timing is maintained on 25 ms increments and correspond with the number of samples taken.

A point should be made about the length of tones and quiet periods used in the timing analysis. These durations are based upon fixed lengths as defined by the Bell Standard Precise Tone Plan with a margin of error added. A fixed duration method was chosen as opposed to a "regular but variable length" pattern detection because it was found that it is very easy for the human voice to unintentionally mimic a repeating pattern of same length tones. The specific case of a person answering their telephone before the algorithm has seen a ring tone can easily be misconstrued as a busy signal if the "hello", pause, "hello" sequence is analyzed independantly of a fixed "standard" for busy or fast busy signals.

Figure 1:
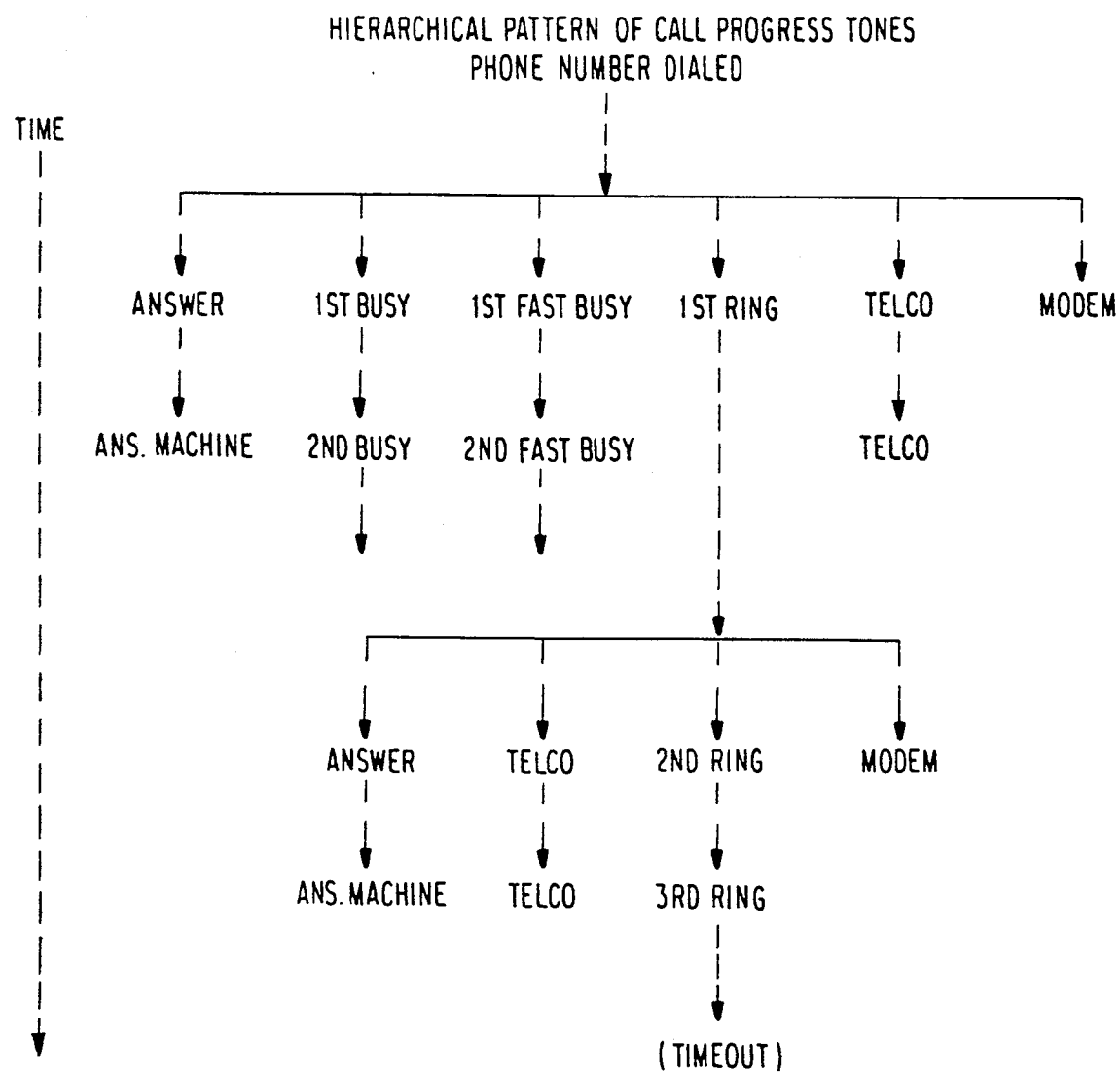
FIG. 1 is a hierarchical diagram illustrating the various categories of audio signals that recognized and classified according to the invention.

The cadence function begins after the last digit in the telephone number is dialed. Every 25 ms sample from then on is collected until a result is determined. The cadence function determines if the WAIT_FOR_EVENT function should be used to sense and time a state change or if the "window analysis" function should be used to take a detailed look at the samples being received. Once the tones have been matched to a particular pattern, a result is returned which indicates if the call has been answered, is busy, has timed out while ringing, has been answered by a modem, is fast busy, has generated merely noise, or has gone dead for this call. Despite all the possible patterns which may be received during a call, it is not always necessary to look for all patterns at all times as illustrated in FIG. 1.

The preferred embodiment of the cadence function is illustrated by the flow charts of FIGS. 7A to 7F. When a call is begun by dialing the telephone number, the cadence function uses the WAIT_FOR_EVENT function to first make sure the telephone line goes quiet and then produces a first tone. This is done in FIG. 7A by setting the TONETIME and the WAITTIME to call setup maximums in function block 70 and then waiting for a QUIET to be returned during the TONETIME in function block 71. A test is made in decision block 72 to determine if the TONETIME has expired, and if so, a return of NOISE is made; otherwise, the process waits for a tone during the WAITTIME in function block 73. A test is made in decision block 74 to determine if the WAITTIME has expired. If so, a further test is made in decision block 75 to determine if there was a previous tone. If not, a return of a dead line is made; otherwise, an answer is returned. Thus, if neither of these events occurs, then the values of "noise" or "dead line" are returned respectively.

Once a tone has been received, the window analysis function is used to determine the nature of this tone. Thus, if the WAITTIME has not expired, the window is analyzed in function block 76. The result of the window analysis determines what further processing is required, as indicated in operation block 77. Some window results warrant an immediate end to the call analysis. If we receive a MODEM tone for example, then we return a "MODEM" result. If the result is one of the three TELCO tones, then the process branches to the flow chart shown in FIG. 7B; if an ANSWER, then to FIG. 7C; if a continuous tone, then to FIG. 7D; and if noise, then to FIG. 7D.

Figure 7A:
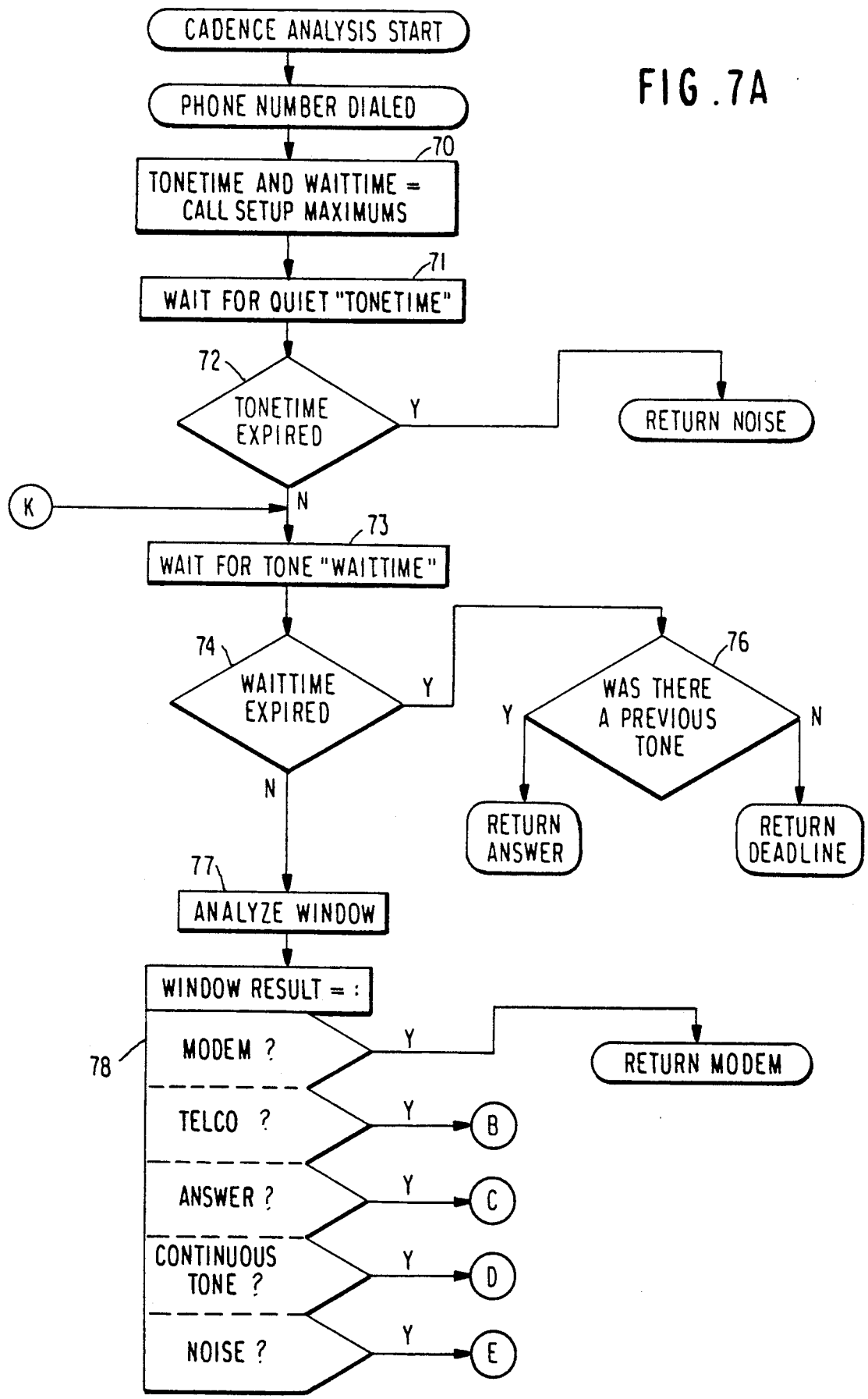
Figure 7B:
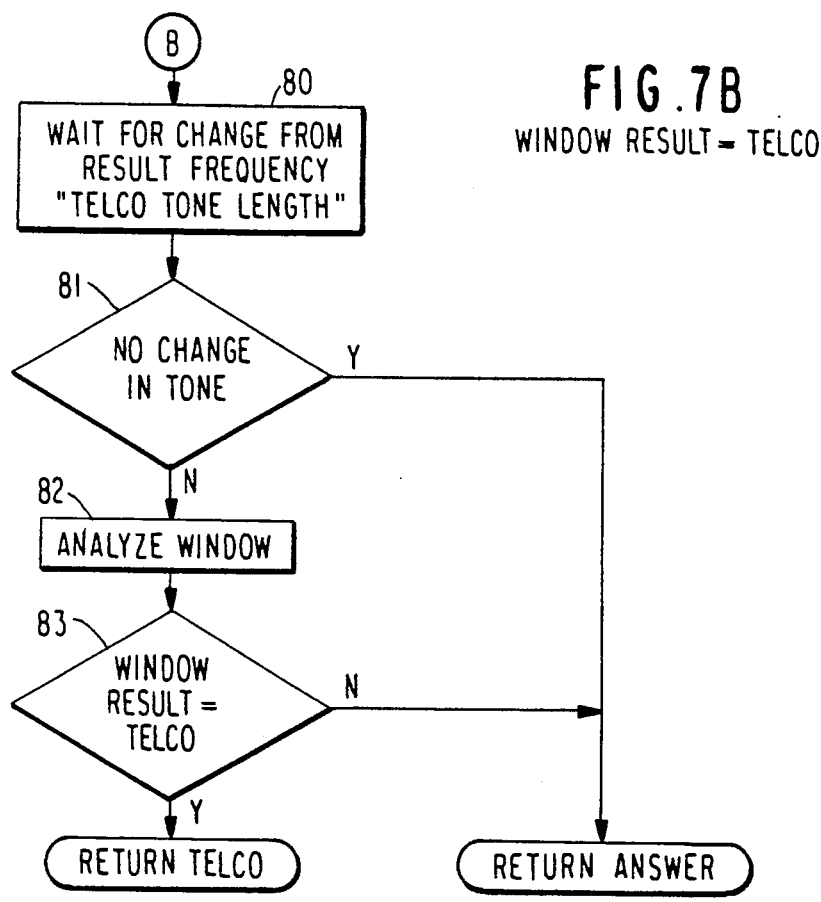

If one of the three defined TELCO tones is received, then in FIG. 7B, the process waits for a change in frequency in function block 80. A test is made in decision block 81 to determine if there has been a change in tone, and if so, a return of ANSWER is made; otherwise, the window is analyzed in function block 82 and the result tested in decision block 83 to determine if the result is a second TELCO tone. If it is, a return of TELCO is made, but if not, a return of ANSWER is made (a very unusual occurrence).

Figure 7C:
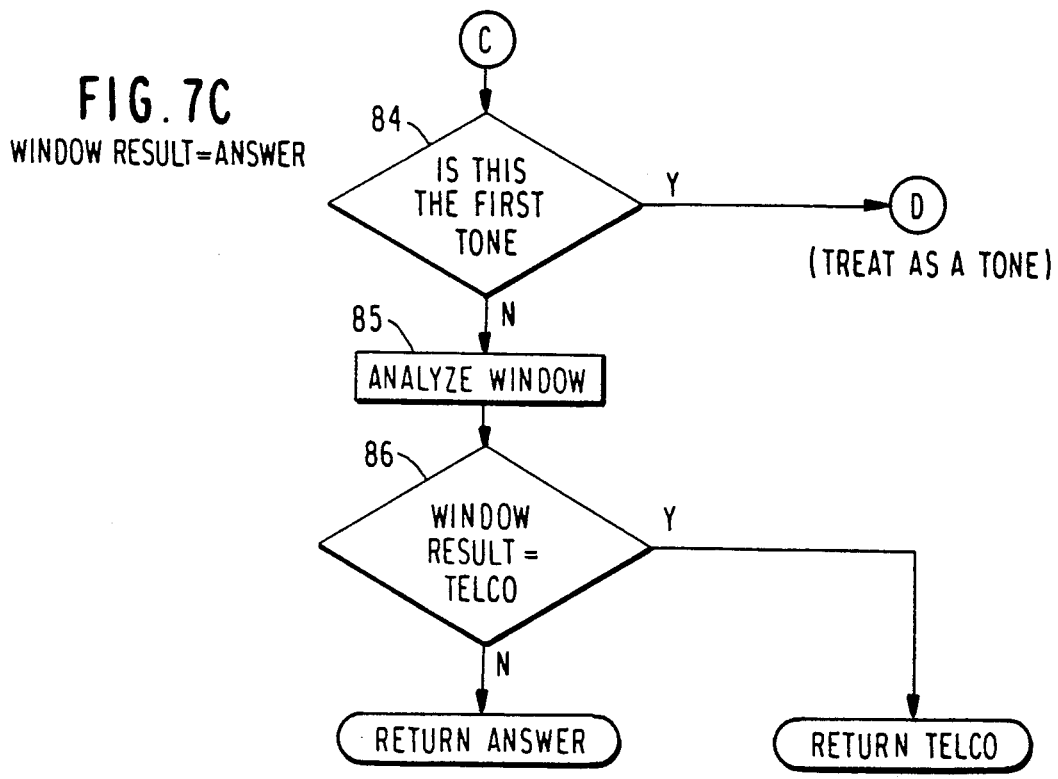

Returning to FIG. 7A, a window result of ANSWER initiates a return of an "answer" result in FIG. 7C, if this had not been the first tone, as determined by decision block 84. The window is analyzed in function block 85, and the window result is tested in decision block 86 to determine if the result is a TELCO tone. If it is, a return of TELCO is made, but otherwise, an ANSWER is returned. If, on the other and, this was the first tone as determined in the test of decision block 84, then it is treated as the start of a continuous "tone", and the process branches to FIG. 7D.

Figure 7D:
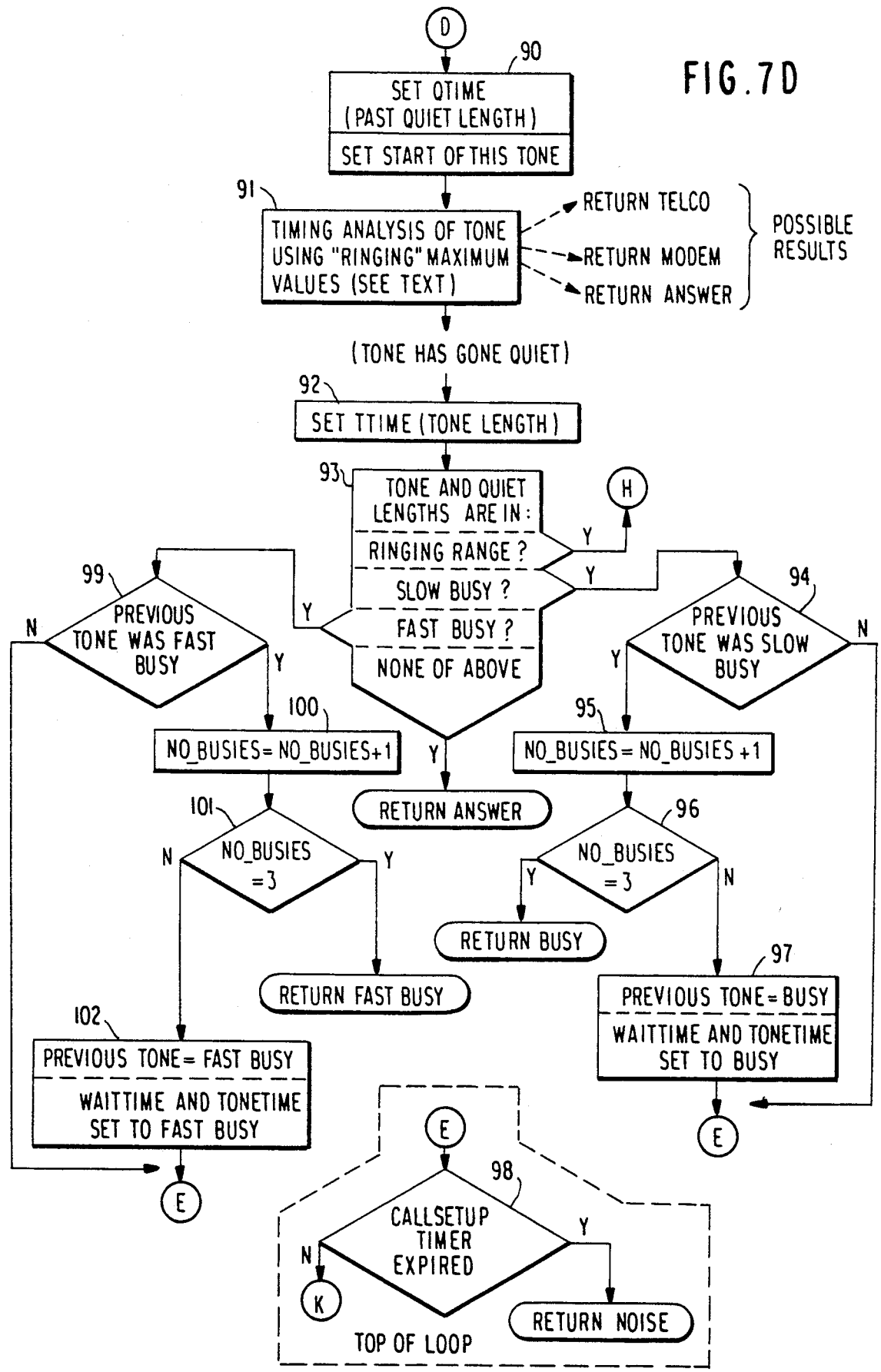

In FIG. 7D, the quiet length or time is set, as is the start of this tone, in function block 90. A timing analysis is made in function block 91 using the "ringing" maximum values. This timing analysis may result in a return of TELCO, MODEM or ANSWER. However, if no return is made, and the tone has gone quiet, the tone length is set in function block 92, and then an analysis of the tone and quiet lengths is made in operation block 93. If the tone and quiet lengths are in the ringing range, the process branches to the flow chart in FIG. 7E.

If the tone and quiet lengths are in the slow busy range, a test is made in decision block 94 to determine if the previous tone was a slow busy tone. If so, the number of busy tones is incremented by one in function block 95, and then the number of busies is tested in decision block 96 to determine if the number equals three. If so, then a BUSY return is made; otherwise, the previous tone is set to BUSY and WAITTIME and TONETIME are both set to BUSY in function block 97. Then a test is made in decision block 98 to determine if the call setup timer has expired. This same test is also made if the test in decision block 94 is negative. If the call setup timer has expired, then a return of NOISE is made; otherwise, the process loops back to block 73 in FIG. 7A.

Returning to operations block 93, if the tone and quiet lengths are in the fast busy range, then a test is made in decision block 99 to determine if the previous tone was a fast busy tone. If not, the process branches to decision block 98, but if so, the number of busy tones is incremented by one in function block 100. Then, in decision block 101, a test is made to determine if the number of busy tones is equal to three. If so, a return of FAST BUSY is made; otherwise, the previous tone is set to FAST BUSY and the WAITTIME and the TONETIME are both set to FAST BUSY in function block 102 before going to decision block 98.

Returning again to operation block 93, if the tone and quite lengths are not in any of the ringing, slow busy or fast busy ranges, then an ANSWER is returned.

Returning to FIG. 7A, if the window result in operation block 78 is NOISE, then the process goes to decision block 98 in FIG. 7D.

Turning now to FIG. 7E, this part of the cadence function is entered when the tone and quiet lengths are determined to be in the ringing range. In function block 110, WAITTIME and TONETIME are set to ringing values, and the process then waits for a new tone during WAITTIME, as indicated by function block 111. If WAITTIME expires, as determined by the test in decision block 112, an ANSWER is returned. Otherwise, the window is analyzed in function block 113. Again, as indicated in operation block 114, if a MODEM is detected, then a MODEM return is immediately made; if a TELCO, then the process loops back to function block 80 in FIG. 7B; if an ANSWER, an ANSWER return is made; if a continuous tone, then the process branches to the process shown in FIG. 7F; and if NOISE, then the process branches also branches to FIG. 7F.

Figure 7F:
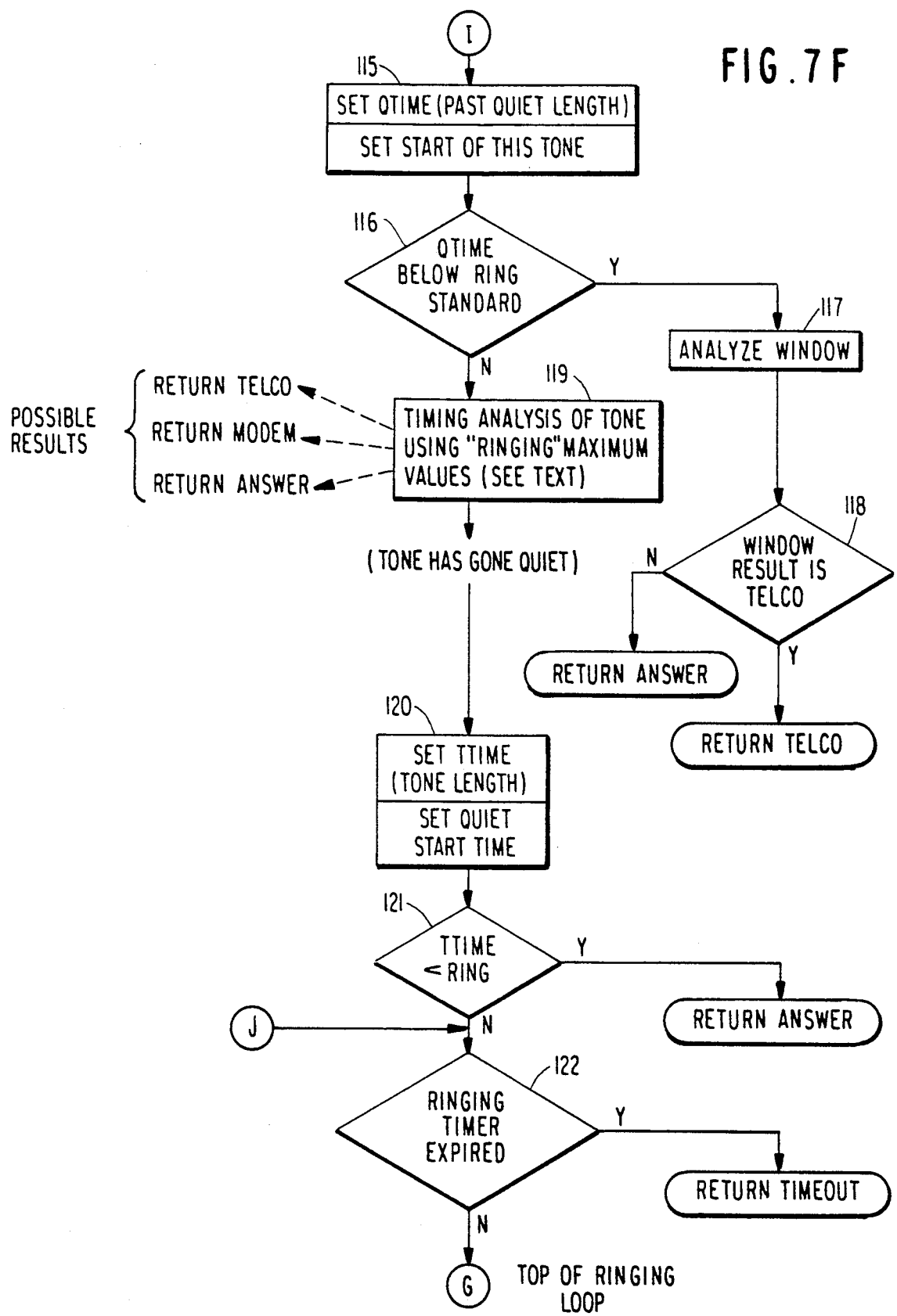

Turning now to FIG. 7F, assuming first that a continuous tone has been detected, the quiet time and the start of this tone are set in function block 115. Then, in decision block 116, a test is made to determine if the quiet time is below the ring standard. If so, the window is analyzed in function block 117, and test is made in decision block 118 to determine if the window result is a TELCO tone. If so, a TELCO result is returned, but if not, an ANSWER is returned.

If the quiet time is not below the ring standard, then a timing analysis of the tone using "ringing" maximum values is made in function block 119. This may return TELCO, MODEM or ANSWER results, but if not and the tone has gone quiet, the tone length is set and the start of the quiet time are set in function block 120. A test is then made in decision block 121 to determine if the TONETIME is less than a ring. If so, an ANSWER is returned, but if not, a further test is made in decision block 122 to determine if the ringing timer has expired. If so, a return of TIMEOUT is made; otherwise, the process loops to block 111 in FIG. 7E.

A window result of "noise" in operation block 114 in FIG. 7E causes a check for overall timeout at decision block 122 in FIG. 7F and then a return to waiting for another tone.

It was discovered that in some very noisy telephone environments, the clicks and pops while waiting for some call results, if severe enough, could mimic the variations that a voiced "hello" can generate. If the cadence function determines no call response before a call progress timer has expired, then "dead line" is returned as the call result. This timer is checked before each new tone is waited for.

If the window result is a continuous "tone" of some kind, then a "timing analysis" is performed which uses the WAIT_FOR_EVENT function to determine when the tone ends within a defined time limit. This time limit is generally the time of a standard ring plus an error factor. This means that a valid call progress tone should cause the WAIT_FOR_EVENT function to terminate early with the length of the tone. If the tone length exceeds the specified timeout, then an "answer" is returned for this unending tone. It has been found that an answering machine with a lot of background noise can cause this type of result. Normally an answering machine would produce quite a substantial variation in samples and very quickly be identified as an "answer". The "timing analysis" section does its real work when the audio samples comprise a warbling or oscillating tone which can easily cause a termination of the WAIT_FOR_EVENT function which tests for a deviation from a range of sample values. When the WAIT_FOR_EVENT function returns a result of "high" or "low but not quiet" the timing analysis section takes another window sample and compares the previous average sample value with the new sample value. If they are within a tolerable range (about 16 Hz), then the timing analysis continues to scan for the true end of the tone. If the averages are not the same, an "answer" is returned. This generally signifies an answer interrupting a "dirty" ring. Since a window of samples has been taken, the timing analysis section is also capable of returning "MODEM", "TELCO", and "answer" as described previously.

Once the timing analysis section has produced the tone duration, this tone duration is compared with the standards for a ring, a slow busy signal, and a fast busy signal. Also, if this has not been the very first "tone", then the time of the quiet interval between tones is known and is checked against the standard times for ringing, busy, and fast busy. In order to qualify as a particular type, the tone length and the intertone quiet length must match the defined pattern. Tones and quiets which do not match these types of ring, busy, or fast busy will initiate a return of "answer". this occurs when a "hello" is identified by the window analysis function as some type of a continuous tone. Three busy signals are required for a result of "busy" or "fast busy" to be returned. If a ring is determined, the state of the entire cadence analysis function changes to reflect this. The timeout now reflects how long the call is permitted to ring before a timeout result should be sent. Busy and fast busy are no longer detected. The procedure is the same; wait for a tone to start within a ringing quiet time and then time any continuous tone within a ringing duration. Now any short tones, short quiet periods, or interruption of rings is immediately construed as an "answer".

The tolerance of the tone durations used in the preferred embodiment are as follows:

| Tone | Length | Tolerance |
| --- | --- | --- |
| Ring | 2000 ms | +1300 ms / −1075 ms |
| Busy | 500 ms | +75 ms / −75 ms |
| Fast Busy | 250 ms | +50 ms / −50 ms |
| TELCO tones | 250 ms | +380 ms / −50 ms |

The band divisions as used in the preferred embodiment are listed in the following table.

BAND SPECTRUM ARRAY

This array is divided into "bands" of tone representing real world values. The center value of each band (i.e., the third TC1 value) is the commonly accepted frequency and the surrounding values allow for imperfect tones as produced by the telephone network.

```
QUIET,  QUIET,  QUIET,  QUIET,  QUIET,
                                         /*end at 4  (0×04)*/
TONE1,  TONE1,  TONE1,  TONE1,
                                         /*end at 08 (0×08)*/
RING,   RING,   RING,   RING,   RING,
                                         /*end at 13 (0×0D)*/
BSY,    BSY,    BSY,    BSY,
                                         /*end at 17 (0×11)*/
TONE2,  TONE2,  TONE2,
                                         /*end at 20 (0×14)*/
TC1,    TC1,    TC1,    TC1,    TC1,
                                         /*end at 25 (0×19)*/
TAP1,   TGAP1,  TGAP1,  TGAP1,  TGAP1,  TGAP1,  TGAP1,
                                         /*end at 32 (0×20)*/
TC2,    TC2,    TC2,    TC2,    TC2,
                                         /*end at 37 (0×25)*/
TGAP2,  TGAP2,  TGAP2,  TGAP2,
                                         /*end at 41 (0×29)*/
TC3,    TC3,    TC3,    TC3,    TC3,
                                         /*end at 46 (0×2E)*/
TGAP3,  TGAP3,  TGAP3,  TGAP3,  TGAP3,  TGAP3,  TGAP3,
                                         /*end at 53 (0×35)*/
MDM,    MDM,    MDM,    MDM,    MDM,    MDM,    MDM,
MDM,    MDM,    MDM,    MDM,    MDM,    MDM,    MDM,
MDM,    MDM,    MDM,    MDM,    MDM,    MDM,    MDM,
MDM,
                                         /*end at 75 (0×4B)*/
OOB,    OOB,    OOB,    OOB,    OOB,    OOB,    OOB,
OOB,    OOB,    OOB,    OOB,    OOB,    OOB,    OOB,
OOB,    OOB,    OOB,    OOB,    OOB,    OOB,    OOB,
OOB,    OOB,    OOB,    OOB,
                                         /*end at 100 (0×64)*/
```

The RETURN_MAP array is used in the preferred embodiment is shown in the following table.

RETURN_MAP ARRAY

This array maps the "bands" of tone found in the band spectrum array to return values. The offset into the array is by BAND number.

| Return Value | Band Number |
|---|---|
| NOISE | /* QUIET band */ |
| TONE | /* TONE1 band */ |
| TONE | /* RING band */ |
| TONE | /* BSY band */ |
| TONE | /* TONE2 band */ |
| TELCO | /* TC1 band */ |
| TONE | /* TGAP1 band */ |
| TELCO | /* TC2 band */ |
| TONE | /* TGAP2 band */ |
| TELCO | /* TC3 band */ |
| TONE | /* TGAP3 band */ |
| MODEM | /* MDM band */ |
| NOISE | /* OOB band */ |

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of classification of audio signals, including call progress tones and voice, on a telephone line comprising the steps of:
    sampling an audio signal by counting the number of zero crossings of the signal during a predetermined time period to generate a first value;
    using said first value as an index into a first array in which are stored band numbers corresponding to a plurality of possible values to produce a band number corresponding to said first value;
    addressing with said band number of second array in which are stored counts corresponding to said band numbers to increment a count corresponding to said band number;
    testing said count to determine if a threshold is exceeded to classify the audio signal as a call progress tone; and
    examining a number of bands and directions of changes of bands to classify the audio signal as voice.

2. The method of recognizing audio signals as recited in claim 1 comprising the steps of:
    detecting a change of state of the audio signal to determine when a tone has begun on the telephone line by requiring two successive samples to be above a predetermined noise threshold; and
    then performing an analysis on a predetermined number of samples comprising a window for the purpose of classifying the tone.

3. The method of classification of audio signals as reacted in claim 2 wherein the step of performing an analysis comprises the steps of:
    timing the duration of detected tones; and
    comparing the timed durations with possible call states to classify detected tones.

4. The method of classification of audio signals as recited in claim 1 wherein said step of sampling comprises using a predetermined sampling time period and dividing the number of zero crossings counted during that time period by two to derive a number representing an average frequency of the audio signal.

5. The method of classification of audio signals as recited in claim 4 further comprising the steps of:
    analyzing a predetermined number of successive samples of audio signal, said predetermined number of successive samples defining a window; and
    assigning a band number to each of said samples of said window based on said sep of analyzing.

6. The method of classification of audio signals as recited in claim 1 wherein there are a plurality of telephone lines, further comprising the steps of:
    selecting one of said telephone lines;
    dialing an outgoing call on the selected telephone line; and
    monitoring the audio signal on said selected telephone line.

7. The method of recognizing audio signals as recited in claim 6 comprising the steps of:
    detecting a change of state of the audio signal to determine when a tone has begun on the telephone line by requiring two successive samples to be above a predetermined noise threshold; and
    then performing an analysis on a predetermined number of samples comprising a window of the purpose of classifying the tone.

8. A method of classification of an audio signal on a telephone line comprising the steps of:
    analyzing a predetermined number of successive samples of the audio signal, said predetermined number of successive samples defining a window;
    assigning a band number to each of said samples of said window based on said step of analyzing; and
    using said band numbers to classify said window into one of several possible results including an answer, a telephone call progress signal, a computer modem or facsimile tone, or noise.

9. The method of classification of an audio signal as recited in claim 8 wherein said step of analyzing comprises determining an average frequency and regularity of the audio signal and assigning a band number to each of said samples and the step of classifying comprises the steps of:
    using the band number to address an array of band values; and
    processing an addressed band value of said array to identify the audio signal.

10. The method of analyzing an audio signal as recited in claim 9 further comprising the steps of:
    testing said successive samples to determine if the band numbers assigned to said samples are the same or are adjacent; and
    if a predetermined number of said band numbers are the same or adjacent, returning a classification for the window of tone.

11. The method of analyzing an audio signal as recited in claim 10 wherein if a predetermined number of said band numbers are not the same or adjacent, then testing the randomness of said audio signal to detect a voice.

12. The method of analyzing an audio signal as recited in claim 9 wherein the step of analyzing further comprises the steps of:
    detecting a change in direction of frequency of successive samples;
    when two successive changes in direction have been detected, accepting the detected change as valid; and
    performing an immediate analysis of the window upon accepting a detected change of direction.

13. A method of timing the progress of tones on a telephone line to classify the outcome of a call from a range of possibilities including answer, busy, ringing or noise comprising the steps of:
   analyzing all possible progress of tones on the telephone line as a hierarchy with a large number of results possible at the start of a call but a greatly reduced number of results after only one or two instances of tone/quiet times;
   determining from a duration of said tone/quiet times a progress analysis path to follow in said hierarchy; and
   returning within a predetermined period of time a classification of the outcome of the call, otherwise returning a timeout indication.

14. The method of timing the progress of tones recited in claim 13 further comprising the steps of:
   analyzing the frequency of detected tones; and
   detecting changes of frequencies to signal a test for possible voice interruptions.

15. The method of timing the progress of tones recited in claim 14 wherein the step of analyzing comprises the steps of:
   analyzing a predetermined number of successive samples of the audio signal, said predetermined number of successive samples defining a window;
   assigning a band number to each of said samples of said window based on step of analyzing; and
   using said band numbers to classify said window into one of several possible results including, an answer, a telephone call progress signal, computer modem or facsimile tone or noise.

16. The method of timing the progress of tones recited in claim 15 wherein said step of analyzing comprises determining an average frequency and regularity of the audio signal and assigning a band number to each of said samples and the step of classifying comprises the steps of:
   using the band number to address an array of band values; and
   processing an addressed band value of said array to identify the audio signal.

17. The method of timing the progress of tones recited in claim 16 further comprising the steps of:
   testing said successive samples to determine if the band numbers assigned to said samples are the same or are adjacent; and
   if a predetermined number of said band numbers are the same or adjacent, returning a classification for the window of tone.

18. The method of analyzing an audio signal as recited in claim 17 wherein if a predetermined number of said band numbers are not the same or adjacent, then testing the randomness of said audio signal to detect a voice.

19. A method for classifying as an audio signal within a predefined frequency bandwidth comprising the steps of:
   dividing said predefined frequency bandwidth into a plurality of smaller frequency ranges called bands;
   sampling said audio signal and assigning each sample to one of said bands corresponding to its frequency;
   analyzing a number of times successive samples change direction from a higher to a lower frequency band or from a lower to a higher frequency band; and
   analyzing the width of a frequency range of said samples and classifying said audio signal according to said number times successive samples change direction and said frequency range width.

20. The method for classifying an audio signal as recited in claim 19 wherein when he number of times successive samples change direction exceeds a predetermined number, the step of analyzing the width of a frequency range is performed by subtracting a lowest frequency band from a highest frequency band to which samples are assigned and classification of said audio signal is made as an oscillating tone the average frequency of which oscillates between tow adjacent frequency bands when the width of the frequency range has a band spread of two or less but as an irregular tone the average frequency of which oscillates between two widely separated frequency bands when the width of the frequency range has a band spread of three or more.

21. The method for classifying an audio signal as recited in claim 20 wherein when the number of times successive samples change direction does not exceed said predetermined number, classification of the audio signal is made as an irregular signal with no average frequency and therefore voice.

* * * * *